United States Patent Office 3,393,255
Patented July 16, 1968

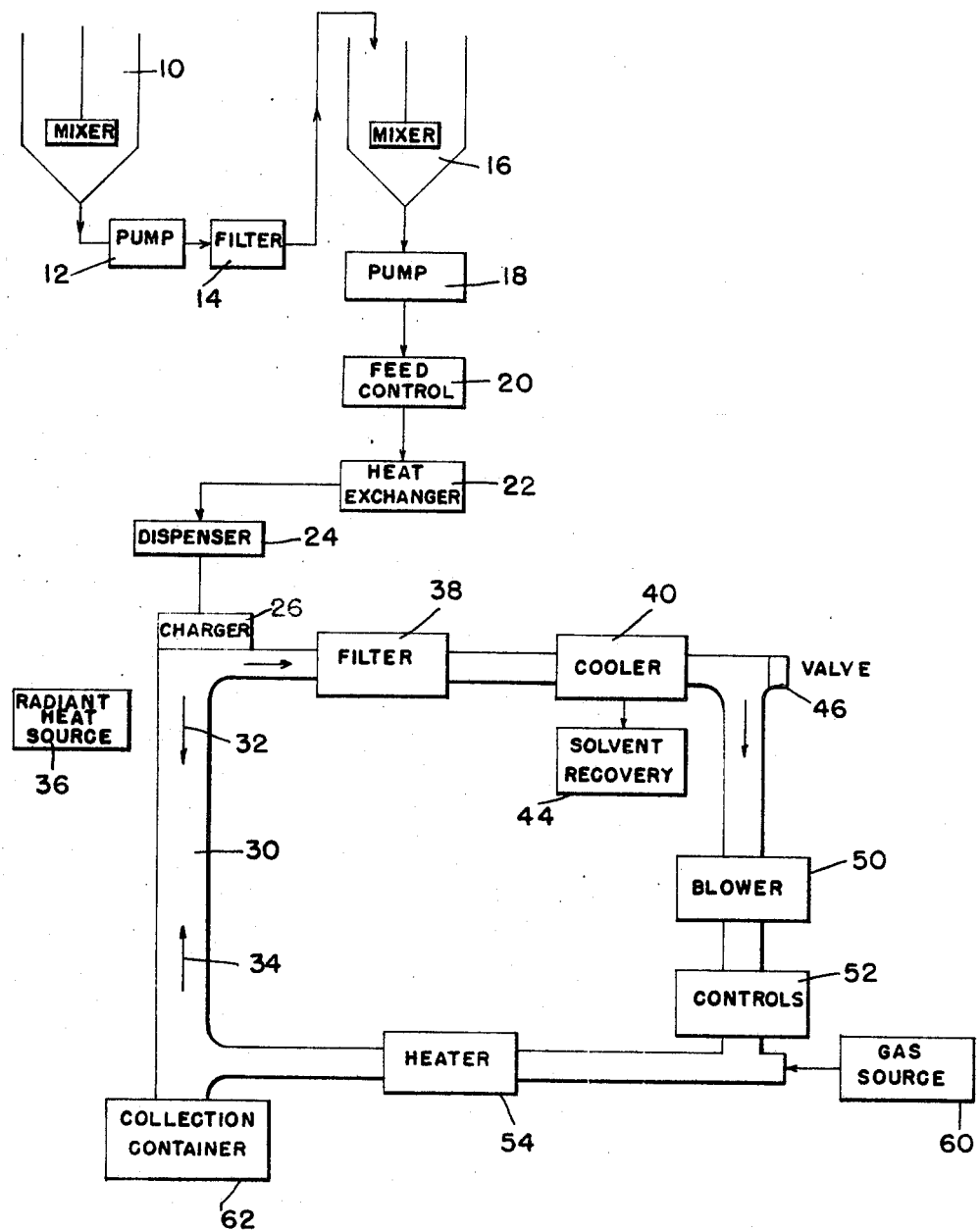

3,393,255
ELECTROSTATIC PROCESS FOR PREPARING GRANULES OF NITROCELLULOSE
Lawrence W. Pell, West Orange, and John J. Lusardi, Dover, N.J., assignors to the United States of America as represented by the Secretary of the Army
Filed Oct. 18, 1966, Ser. No. 588,253
6 Claims. (Cl. 264—3)

ABSTRACT OF THE DISCLOSURE

Process for fabricating solid ingredients including nitrocellulose into granules by passing a heated gas against falling drops of a solution of said solid ingredients. The drops remain unconglommerated due to like electrostatic charges placed on each drop.

---

This invention relates to granular materials and more particularly concerns improved methods of preparing granules for use as gun propellants and in fabrication of rocket propellants.

In the past, smokeless rocket propellant, for example, was prepared either by the solventless extrusion process or cast propellant process, both of which are generally well known. The preparation of casting powder involves procedures which are not inexpensive and attempts have been made to substitute a less expensive ball powder. Ball powder may be fabricated by dispersing a solvent lacquer of nitrocellulose propellant ingredients in water, the latter removing the solvent and forming ball powder spheres upon drying. However, when ballistic modifiers were incorporated into the nitrocellulose propellant ingredients, it was found that undesirable reactions with water and dispersion agents formed precipitates and thus militating against such procedures.

The Plastisol process involves casting techniques known in the art. Ball powder used in this process ranges between about 10 to 40 microns and is of undesirably fine texture.

It is therefore a broad object of this invention to provide improved processes for fabricating low cost casting powders.

Another object of the invention is to provide improved processes for fabricating granular propellants having superior physical properties.

Still another object of the invention is to provide improved processes for fabricating propellants having ballistic properties at least equal to those obtained with solventless extruded propellants.

A further object of the invention is to provide improved processes for fabricating propellants which readily permit incorporation therewithin of monomers, prepolymers, catalysts, plastics, inorganic salts, and the like, into nitrocellulose.

A still further object of the invention is to provide improved processes for economically preparing cast rocket propellants with improved ballistic and physical properties, with improved chemical and physical stability and with higher specific impulses.

The exact nature of this invention as well as other objects and advantages thereof will be readily apparent upon consideration of the following specifications related to the annexed drawing wherein the single figure depicts a schematic flow diagram outlining typical apparatus for practicing the processes of our invention.

The specific proportions of ingredients involved in the preparation of our granules will depend upon many factors such as the ultimate particle size desired, the solvent selected for dissolving nitrocellulose, the temperature of the nitrocellulose-solvent solution, the efficiency of the various apparatus of our invention, etc. Therefore, unless critical, specific quantities or proportions will not be recited, it being sufficient to say that certain conditions will result or be obtained which will be readily understandable by one skilled in the propellant manufacturing art.

Referring now to the drawing, a solvent such as acetone, diethyl ether, ethanol, and the like, is poured into a mixer 10, suitably a jacketed vessel or kettle with a power driven agitator although a horizontal sigma-blade type mixer is preferred. Into this solvent is poured nitrocellulose, up to 35% of the weight of the solvent. Purifying chemicals such as activated carbon, diatomaceous earth, desiccants and the like, and neutralizing chemicals such as sodium carbonate or sodium bicarbonate may be added thereto, in small quantities to obtain a pure and clear solution with good chemical stability.

The nitrocellulose and purifying chemicals are then thoroughly mixed and the resultant solution, suspension or mixture transferred by pump 12, which may suitably be a diaphragm pump, or by gravity through filter 14, suitably a plate and frame type filter press for eliminating undesirable products therefrom such as undissolved impurities.

The filtered solution, along with compounding agents are then introduced into another mixer 16 which may be a stainless steel vessel having a dished head, a curved blade turbine type agitator, a bottom outlet valve, a tightly closed cover and a jacket for heating the contents within the mixer. Compounding agents are well known in the propellant art and may comprise a metal such as aluminum or magnesium or an oxidizer such as potassium nitrate, ammonium perchlorate and the like.

The mixture will then be fed by pump 18 which may be a diaphragm type pump or a submerged centrifugal pump or the mixture may be gravity fed through a feed control 20 which may partake of a manually operated valve or rotameter, or an electrically automatically controlled diaphragm valve.

After the feed control, the mixture wil be passed through a heat exchanger 22, comprising a jacketed pipe having water circulating through the jacket at a temperature within a range of about 100 to 180° F. A dispenser 24, or a drop former, receives the heated solution and prepares or forms drops or droplets thereof. The dispenser may typically be a spray nozzle or a nozzle capable of passing a liquid therethrough with the aid of gas injection to atomize the liquid solution. The spray former could readily be a rotating disc onto which the liquid is fed or it may be a vibrating bar or reed upon which the liquid stream impinges. The droplets will be passed between charge plates 26 or an electrostatic generator made from standard rectifiers feeding a pulsating direct current into a transformer to produce a potential of several thousand volts is maintained in order to electrically charge each droplet. Since the droplets will possess like charges, they will repel each other and not have a tendency to agglomerate.

The charged particles or droplets so formed are then passed into a dryer or reaction chamber 30 wherein the droplets are caused to fall downwardly in the direction of arrow 32 by gravity against a gas stream flowing in the direction indicated by arrow 34 past a radiant heat source 36.

The gas flow rate will be maintained at a sufficiently low velocity to permit the drop to fall downwardly and not be carried upwardly in the direction 34 by the gas stream. As the gas passes the drop, solvent therefrom will vaporize tending to solidify the drop. As the particle becomes drier, evaporation of solvent will be slower resulting in the temperature of the particle being raised and thus causing the monomers and prepolymers, if present, to react and form polymers within the particle. In any case, solid particles will be formed which will retain their shape and not adhere to the chamber or dryer walls or cohere among themselves.

The pressure within the dryer or reaction chamber will depend upon the conditions required by the material to be dried. It may range from an absolute pressure of one centimeter of mercury to a pressure of 100 p.s.i. gauge. However, in most instances, a pressure of about 0 to 5 p.s.i. gauge will work satisfactorily. The temperature will normally fall within the range of about 70 to 150° F.

The gas flow passes through a filter 38 to remove fine suspended particles or drops which happen to be carried by the gas stream and is then introduced into a cooler 40, suitably water-cooled fin type, which will condense solvent vapors which will pass by gravity to a solvent recovery tank 44. The cooled air will pass through a pressure release valve 46 or a weight controlled butterfly valve, into a centrifugal gas blower 50 or fan for circulating the gas past control 52 which will normally be a manual control valve and a flow measuring device such as a rotameter, a heater 54 which will normally be a fin tube exchanger with the gas flowing around the outside of the tubes and hot water or steam within the tubes, and into the dryer or reaction chamber.

A gas source 60 may be tanks of inert gas such as nitrogen or may be an inert gas generator.

The final dried granules of desired size will be collected in a collection container 62.

The granules thus formed by our inventive process will be about 0.1" in diameter and thus admitting of easier handling. Further, our invention lends itself readily to incorporation of other materials being added initially to mixer 10. For example, such other ingredients as explosives other than nitrocellulose, oxidizers, metal powders, staples, fibers, ballistic modifiers, stabilizers and/or catalysts may be dissolved or suspended in a volatile solvent. Also polymers, including but not limited thereto, such as polyesters, polyethylene, polyurethane prepolymers, polysulfide prepolymers, partially polymerized methacrylates, acrylates, fluorinated polymers, synthetic rubbers, styrenes and the like. Similarly, salts of various type may also be used advantageously with our system. When any of the solids aforementioned are not soluble in the selected solvent, the resultant suspension can be formed into drops as aforementioned. The surface tension of the liquid will cause it to surround and coat each solid particle and thus effecting encapsulation of the desired particle.

Other solvents may include nitroglycerin, butane triol trinitrate, metriol trinitrate, triethylene glycol dinitrate, polyurethane prepolymers, styrene, acrylates and methacrylate monomers, vinyl monomers and the like.

The hot gases in reaction chamber 30 need not be limited to nitrogen but may be ordinary air with oxygen removed, or carbon dioxide to which may be added reactive gases such as ammonia, amines, volatile catalysts or organic monomers or reactants. One skilled in the propellant art will realize that granules having chemical compositions with varying physical and chemical properties can readily be attained by judiciously choosing proper starting materials in varying proportions thereof along with temperature and reaction time, and thus obtain a final product having desired characteristics.

When our propellants were tested in standard weapons their ballistic properties including specific impulses were at least equal to standard solventless extruded propellants used by the United States Army and their overall shelf life and stability were excellent.

We claim:
1. A process for preparing granules comprising the steps of
   mixing nitrocellulose into a liquid solvent for said nitrocellulose to form a solution,
   forming droplets from said solution,
   charging said droplets to have like electrostatic charges thereon,
   dispersing said droplets in a gas stream moving in an opposed direction to said charged droplets for solidification thereof to form said granules.
2. The process of claim 1 wherein said solvent is selected from the group consisting of acetone, diethyl ether, and ethanol.
3. The process of claim 1 wherein said gas stream is heated to a temperature of about 70 to 160° F. and pressure of said gas stream is about one centimeter of mercury absolute to 100 p.s.i. gauge.
4. The process of claim 1 wherein purifying chemicals are added to said nitrocellulose solution, said purifying chemicals being selected from the group consisting of activated carbon and diatomaceous earth.
5. The process of claim 1 wherein neutralizing chemicals are added to said nitrocellulose solution, said neutralizing chemicals being selected from the group consisting of sodium carbonate and sodium bicarbonate.
6. The process of claim 1 wherein said nitrocellulose forms up to about 35% of the weight of said solvent.

References Cited

UNITED STATES PATENTS

| | | | |
|---|---|---|---|
| 2,048,651 | 7/1936 | Norton | 264—10 |
| 2,338,570 | 1/1944 | Childs | 264—10 |
| 3,160,686 | 12/1964 | Doyle et al. | 264—10 |

L. DEWAYNE RUTLEDGE, *Primary Examiner.*